United States Patent Office 3,625,720
Patented Dec. 7, 1971

3,625,720
METHOD OF PRODUCING HIGHLY GAS-PERMEABLE REFRACTORY MATERIAL HAVING OPEN PORES
Hiroshi Ohba and Kiyoshi Sugita, Kitakyushu, and Kohei Shimada, Miyako-gun, Japan, assignors to Nippon Steel Corporation, Tokyo, Japan
No Drawing. Filed Oct. 23, 1967, Ser. No. 677,045
Claims priority, application Japan, Oct. 24, 1966, 41/70,142
Int. Cl. C04b 35/42
U.S. Cl. 106—59                                    4 Claims

ABSTRACT OF THE DISCLOSURE

The present invention relates to a method of producing highly gas-permeable refractory material having open pores characterized by mixing unfired chrome ore grains and dead-burnt magnesia grains in the ratios of chrome ore/magnesia of 80/20 to 30/70 to prepare a mixture, which contains fine grains of both materials in an amount less than 20% of the total and forming the mixture to bricks, which are then fired at a temeprature ranging from 1,650 to 1,750° C.

---

The present invention relates to a method of producing highly gas-permeable chrome-magnesia base refractory material having open pores.

For use in a metallurgical furnace or other apparatus used at a high temperature, porous refractory material which bears up against heat is often required. For instance, on the bottom part of a vessel receiving molten steel and the like there are laid porous refractory bricks, through which oxygen or other gas may be blown-in to uniformly produce a lot of bubbles, whereby a uniform agitation of the steel bath may be effected. In such a case it is also possible to perform quickly desulfurization or other treatments of the molten steel by adding to the molten steel a desulfurizing agent or any other additive according to the purpose or, when occasion demands, also possible to cause gas to react with the bath metal.

In order to attain the above mentioned objects, it is necessary to employ porous refractory material which possesses high mechanical strength at high temperature and at the same time good bonding structures. However, the production of such porous refractory material as above mentioned was, heretofore, attended with very much difficulties. On account of a porous refractory material being weak in the bonding between adjacent grains thereof, the mechanical strength thereof is in general low as compared with usual dense refractory materials; and if the strength is to be improved to eliminate the above mentioned drawback, then occurs another difficulty. That is, the strength at high temperature conflicts with the permeability of bricks.

The present invention is to eliminate the above mentioned drawbacks and to provide a method of producing highly gas-impermeable refractory material having open pores, which simultaneously possesses high strength at high temperature and good bonding structure.

The inventors of the present invention have discovered that when firing a formed mixture mainly composed of coarse and middle grain-sized chrome ore grains and magnesia grains in a certain range of temperature, the fired body may obtain an outstanding gas-permeable property, as pore produced at this time being open ones which are necessary for the gas-permeating phenomenon, and at the same time just in the range of temperature, in which the fired body becomes porous, a firm direct bonding structure may be formed between spinel solid solution grains which constitute the main body of chrome ore grains and periclase crystal grains which constitute the main body of magnesia grains. On the basis of the above mentioned facts discovered, the inventors have succeeded in obtaining a porous refractory material having highly gas-permeable property, high mechanical strength at high temperature.

That is, the present invention is to provide a method of producing highly gas-permeable refractory material having open pores, in which unfired chrome ore grains and dead-burnt magnesia grains are employed as raw material and mixed in the ratio of chrome ore/magnesia of 80/20 to 30/70 to obtain a mixture, which contains fine grains of both materials in an amount less than 20% of the total, forming the mixture and firing the body at a temperature ranging from 1,650 to 1,750° C. to produce open pores in the body by a mutual reaction between both materials to be caused by the firing.

In the following the present invention shall be explained in detail. As above mentioned, the refractory material of the present invention belongs to chrome-magnesia series, but the mixing ratio of both materials should be in the range of 80/20 to 30/70. If beyond this range, such a sufficient gas-permeability as characterized by the present invention can not be achieved. It is also necessary to employ chrome ore in an unfired state, which is one of indispensable conditions to cause it to effect high gas-permeating reaction. Further, it is necessary to keep minimum the contents of such components among those involved in chrome ore, as outside of spinel solid solution components, particularly $SiO_2$, CaO and the like, which cause to form a liquid phase at a high temperature. On the other hand, magnesia clinker, from which magnesia grains are obtained, should be such one as is high in the content of MgO, but low in the contents of $SiO_2$ and CaO, and should be used in a high-fired state. As to the grain size of these materials, if according to the classification of the grain size to the three classes, that is, coarse grain (usually 1.0 to 3.0 mm.), middle grain (usually 0.2 to 1.0 mm.) and fine grain (usually below 0.2 mm.) the content of fine grains should be at least 5% but by all means less than 20% of the total. If the content of fine grains is more than 20%, a sufficient permeability can not be obtained. On the other hand, the remainder is to be properly selected to be composed of coarse and middle grains. In this case, however, both grains of chrome ore and magnesia are preferable to be mixed so as to be distributed uniformly in each part. It is at least necessary to have both grains combined in order to cause them to effect an effective mutual reaction with each other, which is the necessary condition for obtaining uniform open pores.

According to the present invention the above mentioned material is formed into bricks. This formation may be of any shape, but for a material to be used as a binding agent at this time it is preferable to use an aqueous solution of magnesium sulfate, magnesium chloride or a mixture of both or such one as disappears by oxidation at a temperature below 1,000° C. and does not produce as a residue such components as $SiO_2$ and CaO which cause to become glassy or form a liquid phase at a high temperature, and the amount thereof to be added is to be limited to the minimum necessary for the forming. Further, it is another necessary condition that such a material as would give rise to a foaming phenomenon in the process after the forming should not be added, because the foaming in the structure due to the material added would have an unfavorable effect in the point of reducing the strength at high temperature, which means a greater disadvantage than the advantage to be effected thereby of increasing the gas-permeable property.

The thus formed material is then subjected to the firing, which is carried out under such conditions as the high gas-permeability and the formation of the firm bonding structure of spinel solid solution and periclase due to the mutual reaction between chrome ore and magnesia may simultaneously be achieved. The firing conditions as above mentioned depend mainly on a firing temperature,

TABLE 2.—MIXING RATIO AND GRAIN SIZE (PERCENT)

| Grain size | Material | |
|---|---|---|
| | Chrome ore | Magnesia clinker |
| 1-3 mm | 50 | 15 |
| 0.2-1 mm | 10 | 5 |
| Below 0.2 mm | 10 | 10 |

TABLE 3.—CHARACTERISTICS OF REFRACTORY MATERIAL (BRICKS)

| Item | Firing temperature and time | | | |
|---|---|---|---|---|
| | 1,500° C.× 2 hours | 1,600° C.× 2 hours | 1,700° C.× 2 hours | 1,800° C.× 2 hours |
| Bulk specific gravity, gr./cc. | 2.83 | 2.71 | 2.69 | 2.88 |
| Apparent specific gravity, gr./cc. | 4.03 | 4.07 | 4.04 | 4.05 |
| Apparent porosity, percent | 29.9 | 33.4 | 33.2 | 28.6 |
| Gas-permeability $\frac{(cm.^3/sec.) \cdot cm.}{cm.^2 \cdot cm. \; H_2O}$ | 0.30 | 0.60 | 1.45 | 0.72 |
| Hot-compressive strength, kg./cm.² (at 1,200° C.) | 25 | 15 | 148 | 315 | and the temperature range of 1,650 to 1,750° C. is most suitable to effect the desired reaction. The firing time is desirable to reside in the range of 1 to 5 hours. In the case of the firing being carried out at a higher temperature or for a longer time than the above mentioned conditions, the gas-permeating reaction will be insufficient, resulting rather in showing a remarkable tendency of lowering the gas-permeability, though the bonding structure will sufficiently be strengthened. When the firing is carried out, however, under the conditions as above described, magnesia and chrome ore will react to produce spinel minerals on their solid solution which expands to make the formed material porous and at the same time to form the firm bonding structure.

The refractory material fired under the conditions as above mentioned is characterized not only by a high gas-permeability but also by a microstructural constitution of a firm direct bonding structure being formed at a certain part between chrome ore grains and periclase grains. Therefore, the refractory material of the present invention shows a high hot-strength, in spite of the presence of numerous open pores for the gas-permeation.

The present invention will be further explained by means of an embodiment.

Unfired chrome ore and dead-burnt magnesia clinker of compositions as shown in Table 1 were mixed in mixing ratios and grain sizes as shown in Table 2. 6 wt. percent of an aqueous solution (28° Bé.) was then added to the mixture and thereafter the mixture was formed to bricks under pressure of 300 kg./cm.². After firing at 1,700° C. for 2 hours, high gas-permeable bricks having characteristics as shown in Table 3 were obtained. For the purpose of comparison Table 3 shows also the results of the firing carried out under conditions beyond those specified by the present invention.

As is evidently seen from the above tables the refractory material composed of a mixture of unfired chrome ore and dead-burnt magnesia prepared in mixing ratios as specified by the present invention and fired at a temperature within the range specified by the present invention shows simultaneously sufficient gas-permeability and sufficient hot-compressive strength as compared with those fired at temperatures out of the range specified by the present invention. In the practical employment of the refractory material prepared according to the method of the present invention as so-called porous plug it was proved to be excellent in gas-permeability, hot-strength and life thereof.

Having thus described the invention, what is claimed is:

1. A method for producing highly gas-permeable refractory material having open pores, consisting essentially of mixing unfired chrome ore grains and dead-burnt magnesia grains in a ratio of chrome ore/magnesia of 80/20 to 30/70 to obtain a mixture, the grain size of which is composed of coarse grains of 1-3 mm., middle grains of 0.2 to 1 mm. and fine grains of below 0.2 mm., said fine grains of both chrome ore and magnesia occupying at least 5 but less than 20% of the total and the rest being middle and coarse grains, forming the mixture into a body and firing the thus produced body at a temperature ranging from 1650 to 1750° C.

2. A process according to claim 1 wherein the amounts of CaO and $SiO_2$ in the unfired chrome ore are 0.28 and 1.64 respectively, and the amounts of CaO and $SiO_2$ in the magnesia 0.98 and 1.46% respectively.

3. The product of the process of claim 1.

4. A process according to claim 1 wherein both chrome ore and magnesia fine grains are present at 10% each of the total.

TABLE 1.—CHEMICAL COMPOSITION OF MATERIALS TO BE MIXED (PERCENT)

| Material | Component | | | | | | | | |
|---|---|---|---|---|---|---|---|---|---|
| | Ig loss | $SiO_2$ | $Al_2O_3$ | FeO | $Fe_2O_3$ | MnO | CaO | MgO | $Cr_2O_3$ |
| Unfired chrome ore | *+1.60 | 1.64 | 12.16 | 21.74 | 6.07 | 0.34 | 0.28 | 11.43 | 45.91 |
| Magnesia clinker | 0.28 | 1.46 | 0.57 | | 0.74 | 0.00 | 0.98 | 95.88 | |

* Indicates an amount increased on ignition.

References Cited

UNITED STATES PATENTS

| | | | |
|---|---|---|---|
| 2,068,641 | 1/1937 | Carrie et al. | 106—59 |
| 3,199,994 | 8/1965 | Davies | 106—59 |
| 3,321,322 | 5/1967 | Mikami | 106—59 |
| 3,360,387 | 12/1967 | Padfield | 106—59 |
| 3,443,974 | 5/1969 | Martinet | 106—59 |

JAMES E. POER, Primary Examiner